(12) United States Patent
Norimatsu et al.

(10) Patent No.: US 8,234,568 B2
(45) Date of Patent: Jul. 31, 2012

(54) SELECTING IMAGE ARRANGEMENT REGIONS BASED ON NUMBER OF USERS

(75) Inventors: Masashi Norimatsu, Kanagawa (JP); Kazuhiro Mino, Tokyo (JP); Kei Yamaji, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 726 days.

(21) Appl. No.: 12/468,323

(22) Filed: May 19, 2009

(65) Prior Publication Data

US 2009/0287996 A1 Nov. 19, 2009

(30) Foreign Application Priority Data

May 19, 2008 (JP) .................................. 2008-130513

(51) Int. Cl.
*G06F 17/00* (2006.01)
(52) U.S. Cl. .......................... 715/246; 715/202; 715/253
(58) Field of Classification Search .................. 715/202, 715/209, 243, 244, 246, 253, 271
See application file for complete search history.

(56) References Cited

U.S. PATENT DOCUMENTS

2006/0053370 A1 3/2006 Hitaka et al.

FOREIGN PATENT DOCUMENTS

JP 2003-125348 4/2003

*Primary Examiner* — Adam M Queler
(74) *Attorney, Agent, or Firm* — Young & Thompson

(57) ABSTRACT

The image layout device configured to enable users to lay out images includes a layout data storing unit configured to store layout data sets that specify image arrangement regions for laying out the images, a layout selecting unit configured to automatically select the layout data set from the layout data storing unit based on a number of the users, an image storing unit configured to store images, one or more position instructing unit configured to select an image to be arranged based on the selected layout data set from stored images, and provide an instruction regarding an arrangement location with respect to the layout data set for the selected image and a layout processing unit configured to determine whether or not an instruction from the instructing unit is executable and, if it is executable, arrange the selected image in accordance with the selected layout data set.

13 Claims, 4 Drawing Sheets

FIG.2
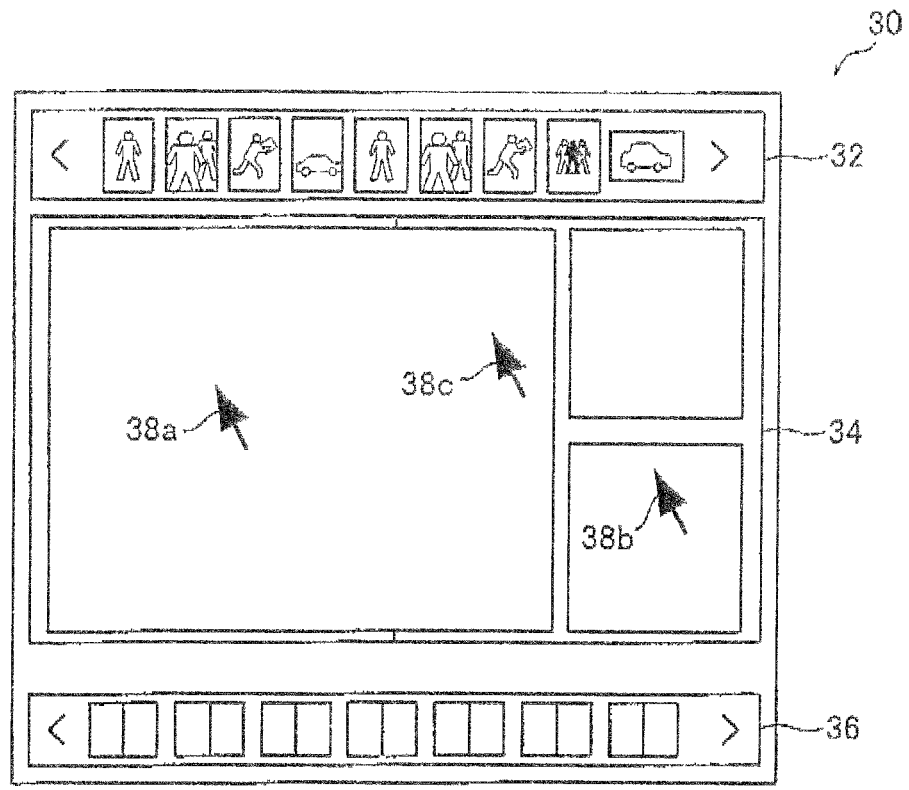
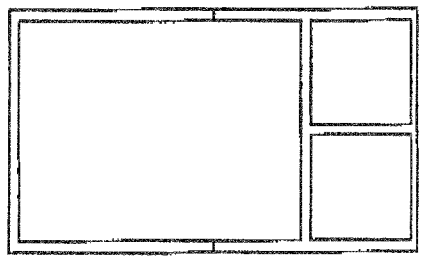
FIG.3A
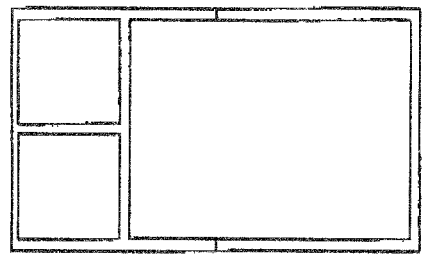
FIG.3B
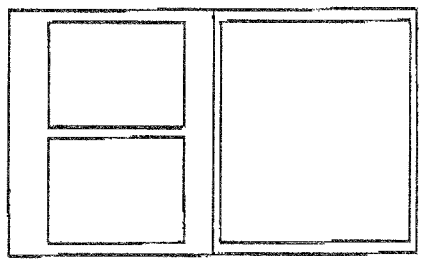
FIG.3C
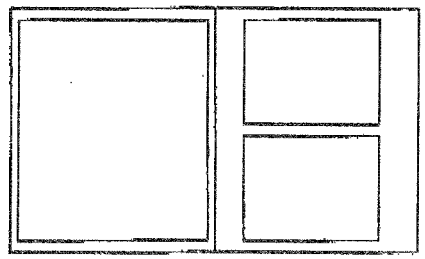
FIG.3D

SELECTING IMAGE ARRANGEMENT REGIONS BASED ON NUMBER OF USERS

BACKGROUND OF THE INVENTION

The present invention relates to an image layout device and image layout method configured to lay out and make browseable image data as an electronic album, and more specifically to an image layout device, recording medium, and image layout method that enable a plurality of users to edit a layout of image data and the like for such an electronic album.

In recent years, various image editing systems that make it possible to edit, save, and browse image data as an electronic album have been proposed. With such systems, there have also been proposed methods for creating an album in accordance with user preferences by having the system perform editing operations, such as selecting and arranging the images to be laid out in the electronic album, in accordance with user preferences.

One such proposed album editing method is a method of automatically laying out image data on a page of an electronic album or the like. For example, in US 2006/0053370A1 is disclosed an electronic album editing apparatus that automatically arranges image data on a page of an electronic album in accordance with an optimum layout without having a user select the layout for the image data. In US 2006/0053370A1, when the user instructs the system to change the album layout after images have been arranged in accordance with preset layout data, the number of images arranged in the electronic album is detected by detecting unit and the layout data are changed according to the detected number, thereby automatically laying out the image data using the optimum layout without having the user select the layout.

Additionally, there have also been proposed methods for enabling a plurality of users to simultaneously edit such an electronic album.

For example, in JP, A, 2003-125348 is disclosed an image editing apparatus that enables a plurality of users to edit a single image. In JP, A, 2003-125348, it is stated that, even in a case where a plurality of users simultaneously input drawings and text for the same image, the input work can be performed in a short period of time with superior operability using an image editing apparatus provided with a plurality of display screens and a plurality of image editing unit corresponding to each display screen.

However, in US 2006/0053370A1, there is not described a case where the layout, etc., of images are edited using a terminal device operable by a plurality of users, and thus the problem arises that the layout of the album cannot be created in accordance with the preferences of each user. Further, while JP, A, 2003-125348 addresses editing, such as the writing of drawings, text, and the like, performed on a single image, the invention does not support cases where more complex processing is to be performed, such as image editing using a plurality of images.

As a result, unit for streamlining the work of generating a layout of image data performed by a plurality of users has been long sought-after.

SUMMARY OF THE INVENTION

It is therefore an object of the present invention to solve the above-described problems of prior art and provide an image layout device, recording medium, and image layout method that make it possible to perform efficient layout processing with high user work efficiency and superior operability when images to be arranged in an electronic album are selected and laid out, even in a case where the images are to be selected and arranged in a single album shared by a plurality of users.

BRIEF DESCRIPTION OF THE DRAWINGS

FIG. 2 is a diagram illustrating an example of the initial screen of the image layout device.

FIGS. 3A to 3D are diagrams illustrating examples of different templates.

DETAILED DESCRIPTION OF THE INVENTION

The following describes in detail the preferred embodiments of the image layout device according to the present invention, which are shown in accompanying drawings.

Embodiment 1

Figure 1:
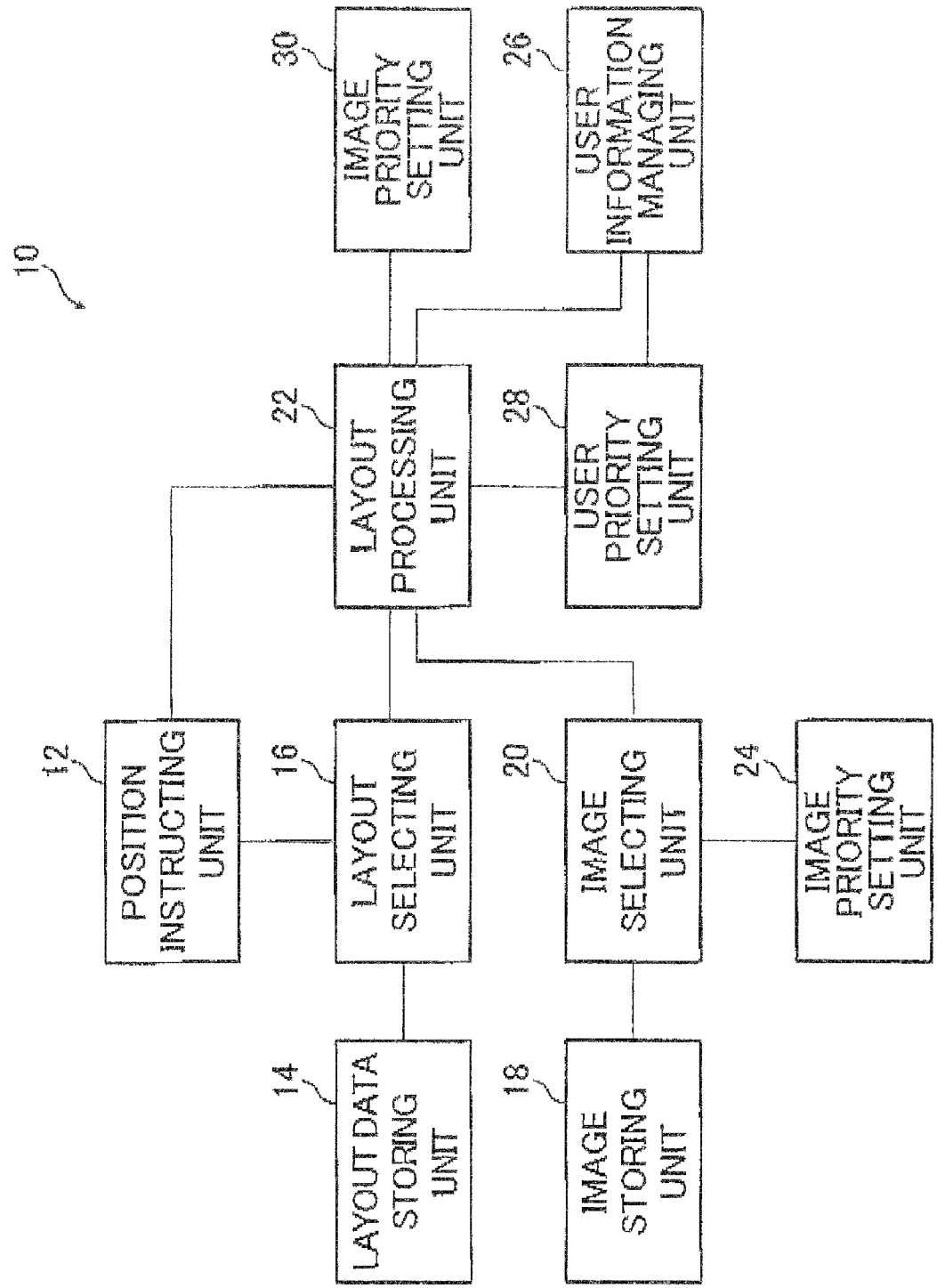
FIG. 1 is a block diagram illustrating a configuration of an image layout device according to an embodiment of the present invention.

FIG. 1 illustrates the configuration of an image layout device 10 according to embodiment 1 of the present invention. The image layout device 10 is for enabling a plurality of users to lay out images on a page of an electronic album.

The image layout device 10 comprises a position instructing unit 12, a layout data storing unit 14, a layout selecting unit 16, an image storing unit 18, an image selecting unit 20, a layout processing unit 22, an image priority setting unit 24, an user information managing unit 26, an user priority setting unit 28, and a display unit 30.

FIG. 2 illustrates an example of the initial screen displayed by the display unit 30 of the image layout device 10. With the image layout device 10, a layout screen of a page of an electronic album such as that shown in the example in the figure is displayed as the initial screen. The initial screen shown in FIG. 2 comprises an image selecting region 32, a layout editing region 34, and a page verifying region 36. In the example shown in the figure, each of three users 1P, 2P, and 3P arranges image data using a his/her own position instructing unit 12. As a result, pointers 38a to 38c of each user, which indicate the operation contents of each of the position instructing unit 12, are displayed on the initial screen. These pointers correspond to the position instructing unit 12 of each user.

When each image is to be arranged on a page of the electronic album, the position instructing unit 12 provides instructions to the image layout device 10 regarding the arrangement position on the screen of the display unit 30. The specific form of the position instructing unit 12 is not particularly limited, and any of the various known operation devices may be used, such as a remote controller, mouse, or touch-pen.

There are at least one or more of the position instructing unit 12, and each is assigned on a per user basis. The user identification information of the user who uses the position instructing unit 12 is set in advance in the position instructing unit 12. The user identification information is associated with the user information of each user stored in the user information managing unit 26 described later. When an image is arranged, the position instructing unit 12 provides layout instructions by sending the user identification information of the user operating the position instructing unit 12, the user priority information for determining the priority order when images are arranged, and the contents of the layout instruction to the layout processing unit 22 described later. The operation of the position instructing unit 12 is linked with the movement of the pointer 38 so that the user can operate the position instructing unit 12 while viewing the position and movement of the pointer 38.

While each of the plurality of users lay out images using his/her own position instructing unit 12 while viewing the same display unit 30 in the present embodiment, the present invention is not limited thereto and each user may remotely lay out images in the same electronic album using a device such as a PC. In such a case, each user can lay out images by using the monitor of his/her PC as the display unit 30, and the mouse, keyboard, or the like of the PC as the position instructing unit 12.

Further, while one user lays out images using one position instructing unit 12 in the embodiment, the present invention is not limited thereto, and one position instructing unit 12 may be shared by a plurality of users. In such a case, each user changes user identification information settings before beginning operation by entering his/her own user identification information into the position instructing unit 12 or further into the layout processing unit 22 by an input operation such as pressing a button, tabbing, or the like.

With this arrangement, even in the event that there are fewer position instructing unit 12 than the actual number of users, the operations performed, by each user can be identified by having a plurality of users operate a single position instructing unit 12 while switching the user identification information.

The layout data storing unit 14 (hereinafter "layout storing unit 14") stores and saves a plurality of layout data sets to serve as templates when laying out images on each page of the electronic album.

FIGS. 3A to 3D illustrate examples of layout data sets. While the examples in the figure show layout data sets having three image arrangement regions on each of the two facing pages, the layout data sets may have two or less or four or more image arrangement regions. Additionally, the layout patterns are not limited to the four patterns shown in FIGS. 3A to 3D, but layout data sets of other arrangements may be included as well. In the present invention, there are at least one or more types of layout data sets of one image arrangement region to a number of image arrangement regions equivalent to the number of position instructing unit 12, respectively. Furthermore, in a case where one position instructing unit 12 is used by a plurality of users, a layout data set having a larger number of image arrangement regions than the number of position instructing unit 12 is preferred.

For each image arrangement region of the layout data set, a region priority setting is set in accordance with the region surface area and arranged position. Region priority settings will be described in detail later.

The layout selecting unit 16 selects the appropriate layout data set from the layout storing unit 14 in accordance with the number of users operating the image layout device 10, and sets the selected layout data set on a page of the electronic album.

The layout selecting unit 16 is provided with a user activity monitoring function that monitors the activities of the position instructing unit 12 and, based on the monitoring results, detects the quantity of user identification information received from the position instructing unit 12 currently used with the image layout device 10, and regards that quantity as the number of users performing operations. Then, the layout selecting unit 16 selects a layout data set having a number of image arrangement regions greater than or equal to the number of detected users from the layout storing unit 14. The selected layout data set is displayed in the layout editing region 34 of the display unit 30.

In a case where one position instructing unit 12 that has suspended activity for a certain period of time or longer exists among the position instructing unit 12 initially detected during the monitoring process, the user of that position instructing unit 12 is regarded as having left his/her seat and the layout selecting unit 16 decreases the number of users and reselects a layout data set in accordance with the number of remaining users.

The image storing unit 18 stores and saves image data to be arranged on a page of the electronic album in accordance with the layout data set.

The saved image data are not particularly limited. For example, image data taken by a user with filming equipment such as a camera or image data downloaded from a network may be directly obtained by connecting the filming equipment to the image layout device 10 or indirectly obtained via a network and stored in the image storing unit 18.

The image selecting unit 20 selects image data that can be laid out from the image data stored in the image storing unit 18, and displays the selected image data as thumbnail images in the image selecting region 32 of the display unit 30. The image data displayed in the image selecting region 32 may include all image data stored in the image storing unit 18, or only image data suitably selected by the image selecting unit 20.

The displayed image data are arranged in an arbitrary image arrangement region of the layout editing region 34 when the user selects the image data and provides an arrangement instruction using the position instructing unit 12. The image selecting unit 20 comprises a control function that links, stores, and controls information such as the identification information for each set of image data, the process such as delete or move to be performed on the arranged image data in the layout editing region 34, the image data status, and the user who executed each process.

The layout processing unit 22 arranges, changes, or cancels the arrangement of the image data selected by the image selecting unit 20 in each image arrangement region of the layout data set displayed in the layout editing region 34 in accordance with the image priority setting, user priority setting, and region priority setting.

When the layout is completed, a thumbnail image of that page is displayed in the page verifying region 36. This arrangement makes it possible for the user to grasp the status of the layout of all pages in the electronic album.

The image priority setting unit 24 sets an image priority setting for each set of image data in order to determine which instruction is to be performed with priority in a case where a plurality of users provide multiple arrangement instructions that compete against each other at the time image data stored in the image storing unit 18 are arranged on a page.

The image priority setting is automatically set in advance for each set of image data based on image analytical results and the like, linked with image data identification information, and stored in the image priority setting unit 24.

Now the image priority settings and setting method will be described.

Image priority values may be set by setting a score, which is numerical data, for each set of image data.

Image priority settings can be set in advance based on the results of analyzing the contents of the image data. For example, images of faces may be given a higher image priority setting, and images of simply scenery may be given a lower image priority setting. Further, among the images of faces, those with a greater facial surface area may be given a higher image priority setting.

When images are laid out, the image priority setting may be changed in accordance with the status of image data use or the like. For example, the image priority setting of an image that has been selected as an arranged image and laid out numerous times by a plurality of users may be increased. In such a case, the image priority score may be increased and the image priority setting may be updated each time a user selects the image data or each time the image data are arranged in the layout editing region 34.

Further, as described later, priority settings may be set not just for image data, but for each user as well. With this arrangement, the image priority setting may be increased for image data selected by users having a higher priority setting.

Furthermore, the image priority setting may be suitably set and changed by a user. In such a case, the user increases the image priority setting of those images he/she wants to arrange in an image arrangement region having a large surface area. At this time, the cost of increasing the image priority setting is a decrease in the user priority score of the user who set the setting. This will be described in detail later.

The user priority setting unit 28 sets the user priority setting for each user in order to determine which instruction is to be performed with priority in a case where, for example, multiple instructions from the users who use the image layout device 10 are in competition with each other.

As described above, in the image layout device 10 of the present invention, priority settings are set for image data and users. The user priority setting is set for each set of user identification information set in the position instructing unit 12 used by each user. Further, the user priority setting, similar to the image priority setting, may be set as a numerical value (score), or as a priority order with respect to other users.

The user priority setting is arbitrarily set for each user in advance on the initial setting screen or the like. The setting may be automatically set on the device side, or manually set by each user. In the initial state, the user priority setting may be different or the same for each user.

The set user priority settings are stored in association with user information, which is the information related to each user, in the user information managing unit 26 described later.

The user priority settings fluctuate in accordance with the operation status of each user. That is, the user priority setting unit 28 analyzes the editing operations of each user from the position instructing unit 12, such as the amount of movement of the position instructing unit 12, and dynamically changes the user priority settings in accordance with the analytical results.

For example, the user priority setting unit 28 sets a high user priority setting for a user who frequently performs operations such as image arrangement and, when there is not much movement by the position instructing unit 12, regards the user as not performing many operations and lowers the user priority setting.

Further, each type of operation performed by the position instructing unit 12 may be set as an operation that increases the user priority setting or an operation that decreases the user priority setting. For example, to ensure that each user arranges image data equally to the extent possible, the user priority setting may be decreased when an operation involving an image arrangement instruction is performed, and increased when an arrangement is cancelled.

Furthermore, the user priority setting may be set to zero in a case where the position instructing unit 12 has not moved at all and the user is regarded as not performing any operations. In such as case, the user is regarded as non-existent.

Further, as described above, when a user changes a setting so as to increase an image priority setting of a particular image, the priority score of the user who made the change is decreased as payment for the change.

The image priority settings and user priority settings are preferably displayed in a form recognizable by a user on the display unit 30. Accordingly, the layout processing unit 22, for example, preferably has a priority verification function that makes the user check image priority settings and user priority settings.

As the image priority verification function, for example, the image priority setting corresponding to each image may be displayed near each thumbnail image in the image selecting region 32. Or, a decorative feature such as a border may be provided to the thumbnail image so that the user can recognize the image priority setting by color, shape, or the like. Or, when a user selects an image in the image selecting region 32, the image priority setting for that image may be displayed.

Further, examples of the user priority verification function include changing the display method of the pointer 38. For example, the size of the pointer 38 may increase or the color of the pointer 38 may change in the order of descending user priority settings, thereby making the user priority setting visually recognizable to each user. Further, a display region of user priority settings may be provided on the screen of the display unit 30 so that the user priority setting of each user is always displayed. Or, the user priority verifying unit may produce a sound at the time of operation so that the user priority setting is recognized according to the type of sound.

Further, since the user priority settings fluctuate as images are arranged, a message may be displayed on the screen or indicated by audio, or a sound or light may be emitted by the display unit 30 so that the change in priority is recognized by the user.

The user information managing unit 26 associates and manages the user identification information set in the position instructing unit 12 and the user information of the user who uses the position instructing unit 12. Examples of user information include the above-described user priority setting. Further, user information may include various information related to the user such as a user profile or processing history.

The layout processing unit 22 executes image layout instructions from the plurality of position instructing unit 12, based on the user identification information received from the position instructing unit 12, and the user information managed by the user information managing unit 26 that corresponds to that user identification information.

A screen for laying out image data is displayed on the display unit 30, as shown in FIG. 2. The user arranges the image data using the position instructing unit 12 while viewing the display unit 30.

Next, the specific action of the image layout device 10 will be described.

The following will first describe image data selection and arrangement.

The initial screen shown in FIG. 2 displays a list of image data stored in the image storing unit 18 in the image selecting region 32 as thumbnail images. The thumbnail image list can be scrolled in the horizontal direction.

When image data are laid out, first the layout selecting unit 16 detects the number of sets of user identification information received from the position instructing unit 12, thereby detecting the number of users who will be laying out images.

When the number of users is detected, the layout selecting unit 16 finds the layout data set corresponding to the number of users in the layout storing unit 14, and displays the layout data set in the layout editing region 34 of the display unit 30.

In the present embodiment, as an example, the number of users detected is three. In such a case, the layout selecting unit 16 finds the layout data set comprising three or more image arrangement regions, and automatically selects one layout data set therefrom.

When there are a continuous number of pages having the same layout in a single electronic album, the album becomes rather monotonous. To avoid this, a layout that differs from the layouts of the previous and next pages is preferably selected when selecting the layout data set. Accordingly, the layout selecting unit 16 stores information on the layout data sets already used on other pages of the electronic album to be laid out, and selects a layout data set based on that information. With this arrangement, a continuous number of pages having the same layout is prevented.

In a case where a user does not like the layout data set automatically selected by the layout selecting unit 16, the user may reselect the layout data set using the position instructing unit 12.

The page verifying region 36 shown in FIG. 2 displays the thumbnail images of all pages created in the album. The page verifying region 36 can be scrolled in the horizontal direction. The user selects a layout while viewing these thumbnail images, thereby ensuring selection of the appropriate layout data set that will not result in continuous identical layout data sets, even in a case where the user selects the layout data set.

When the layout selecting unit 16 selects the layout data set, the selected layout data set is displayed in the layout editing region 34 of the display unit 30.

When the layout data set is displayed, each user arranges arbitrary image data from the image data displayed in the image selecting region 32 in the image arrangement regions of the layout editing region 34, using the position instructing unit 12.

Figure 4:
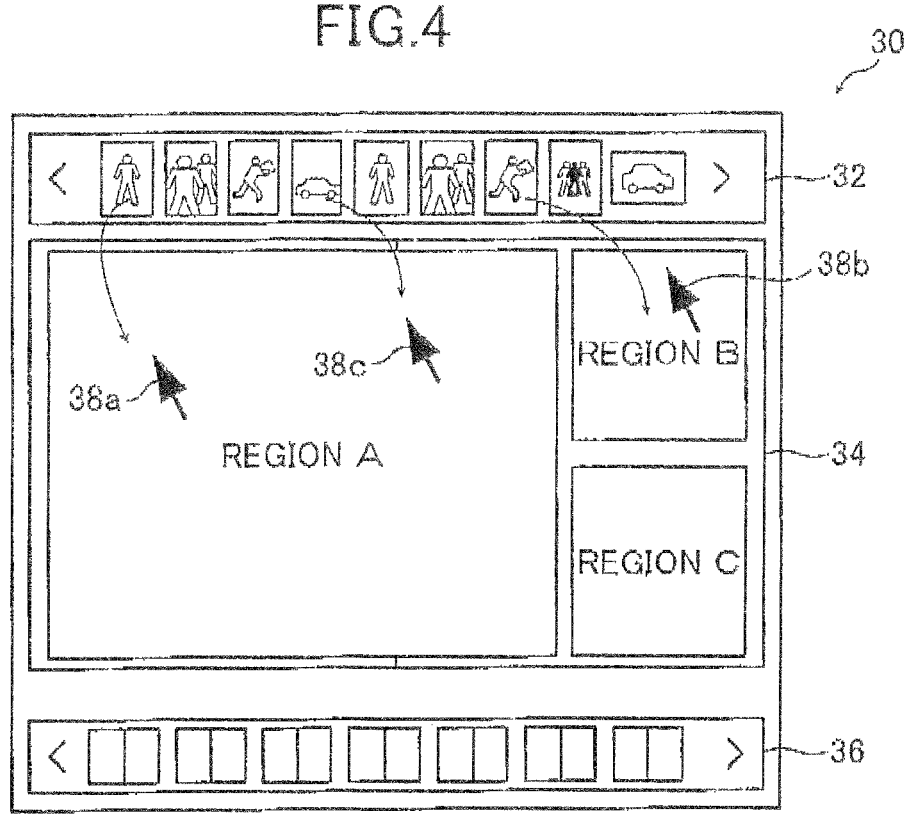
FIG. 4 is a diagram illustrating an example of a screen before the layout process is performed.

FIG. 4 shows an image view of image data selection and arrangement.

Each user selects the image he/she wants to arrange from among the thumbnail images displayed in the image selecting region 32, and specifies his/her desired image arrangement region in the layout editing region 34 using the position instructing unit 12. This operation of region specification may be performed by dragging the thumbnail image to the image arrangement region.

Here, in FIG. 4, each user has selected a different image, and the user 1P and the user 3P instruct the system to arrange the selected image in region A, and the user 2P instructs the system to arrange the selected image in region B.

In the present invention, in a case where a plurality of users provide instructions for arranging different images in the same region as described above, the layout processing unit 22 determines the priority order in which the instructions are to be executed based on instruction circumstances and the aforementioned image priority settings, user priority settings, and region priority settings, and arranges the image data accordingly. With this arrangement, even in a case where image data layout is performed by a plurality of users, the images can be laid out with superior operability and efficiency.

Examples of the image arrangement method include a first method of determining which instruction is to be given priority based on instruction timing.

For example, the user who first selects region A may be permitted to arrange an image in that region. In the example shown in the figure, in a case where the user 1P selects region A before the user 3P, the instruction of the user 1P is executed. At this time, in a case where the user 3P provided an instruction to arrange another image in region A where an image has already been arranged by the user 1P, the layout processing unit 22 does not execute the instruction and arranges the image specified by the user 3P in another image arrangement region where an image has not been arranged, that is, in region C in FIG. 4. In a case where a region where an image has not been arranged does not exist, the image selected by the user 3P is not arranged on the page.

Or, conversely, the user who most recently selected region A may be given priority for arranging an image in that region. For example, in the example shown in the figure, in a case where the user 1P selects region A before the user 3P, the instruction of the user 1P is executed, and then the instruction of the user 3P is executed. That is, to always give priority to the most recent instruction, when the user 3P provides an instruction for arranging another image in region A where an image has already been arranged by the user 1, the layout processing unit 22 executes the instruction of the user 3P, and arranges the image of the user 1P that had been arranged in region A up to that point into another image arrangement region where an image has not been arranged. In a case where a region where an image has not been arranged does not exist, the image selected by the user 1P is not arranged on the page.

Further, as a second method, images can be arranged based on the aforementioned user priority settings. In such a case, the layout processing unit 22 acquires the user identification information set in the position instructing unit 12 of the users 1P and 3P who provided instructions for arranging an image in the same region A. Furthermore, the layout processing unit 22 acquires the user priority settings of users 1P and 3P based on the user identification information, from the user information managing unit 26. Then, the instruction of the user having the higher priority score is executed. For example, in a case where the user priority setting of the user 1P is higher than that of the user 3P, the image selected by the user 1P is arranged in region A. If the user 3P drags an image to region A in an attempt to arrange the image in region A at this time, the layout processing unit 22 does not accept the instruction. Or, in a case where another region where an image has not been arranged exists, the image selected by the user 3P is arranged in that region. In the example shown in the figure, the image selected by the user 3P is arranged in region C, which is a region where an image has not been arranged.

Furthermore, in a case where the user priority setting of the user 2P is lower than that of the user 1P, the user 2P is not permitted to arrange an image in region A, similar to the user 3P. Conversely, in a case where the user priority setting of the user 2P is higher than that of the user 1P, the instruction of the user 2P is given priority. Even in the event the image of the user 1P is first arranged in region A and subsequently the user 22 attempts to arrange an image in region A, the instruction is executed and the image selected by the user 2P is arranged in region A. Then, the image of the user 1P that had been arranged in region A up to this point is arranged in a region where an image has not been arranged (region C in the example shown in the figure). In a case where an image is arranged in each region, the image of the user 1P is not arranged on the page.

Furthermore, as a third method, images can be arranged in each region using user priority settings and the region priority settings set for image arrangement regions. In such a case, a user simply selects an image to be arranged without selecting an image arrangement region, and the layout processing unit 22 automatically assigns and arranges the selected image in a region.

A region priority setting is set for each image arrangement region so that the setting is higher for those image arrangement regions with a higher surface area and for locations that are readily noticeable such as locations near the center of the page.

For example, in FIG. 4, the region priority settings of regions A, B, and C are set in the descending order of A>B>C, and the user priority settings for the users 1P, 2P, and 3P are set in the descending order of 1P>2P>3P. At this time, an image selected by a user having a higher user priority setting is arranged in a region having a higher region priority setting. That is, the image selected by the user 1P is arranged in region A, the image selected by the user 2P is arranged in region B, and the image selected by the user 3P is arranged in region C.

In this method, the arranged position of an image is determined based on the region priority setting and user priority setting only, regardless of the instruction from each user, and the image is arranged accordingly.

Or, as a fourth method, an image can be arranged based on the aforementioned image priority setting of the image data. In such a case, the layout processing unit 22 acquires the image priority settings of each set of image data selected by users who are attempting to arrange images in the same region, from the image priority setting unit 24 via the image selecting unit 20. Then, the image data having a higher priority score is arranged in that region. For example, in the example shown in FIG. 4, in a case where the image priority score of the image data selected by the user 1P is higher than that of the image data selected by the user 3P, the image selected by the user 1P is arranged in region A. Even if the user 3P attempts to drag and arrange an image to the region A at this time, the layout processing unit 22 either does not accept the instruction or arranges the image selected by the user 3P in the region C where an image has not been arranged.

Or, in a case where the user 3P reselects image data having an image priority setting higher than that of the image data arranged in region A by the user 1P and provides an instruction to arrange that image in the region A once again, the instruction of the user 3P is given priority and the image selected by the user 3P is arranged in the region A. At this time, the image arranged by the user 1P is arranged in the region C where an image has not been arranged.

Furthermore, as a fifth method, the region priority settings of the image arrangement regions and the image priority settings may be combined so that image data having a high priority setting are arranged in an image arrangement region having a high priority setting. In such a case, a user simply selects an image to be arranged, and the layout processing unit 22 automatically assigns and arranges the selected image in a region.

For example, in FIG. 4, the priority settings of regions A, B, and C are set in the descending order of A>B>C. At this time, of the images selected by each user, the image having the highest priority setting is arranged in region A having the highest region priority setting, and the image having the next highest image priority setting is arranged in region R, and the image having the third highest priority setting is arranged in region C.

Further, during image layout, in a case where a number of images greater than the number of image arrangement regions of the layout data set displayed in the layout editing region 34 is selected as the images to be arranged, the layout selecting unit 16 may reselect the layout data set in accordance with the number of selected images. For example, in the above example, there are three users and therefore a layout data set having three image arrangement regions is selected. However, in a case where four images are selected by the users, the layout selecting unit 16 may search for a layout data set having four image arrangement regions and reselect that layout data set as the layout data set to be used on that page.

Further, an upper limit of the number of images that a user can arrange on a single page is preferably set. The upper limit value may be set in advance as the same value for all users, or set for each user in accordance with the user priority setting. In a case where the images to be arranged are set in accordance with the user priority setting, settings may be set so that the user 1P having the highest user priority setting can set three images, the user 2P having the second highest priority setting can set two images, and the user 3P having the lowest user priority setting can set only one image, for example.

Conversely, the number of image arrangement regions can also be reduced. For example, in a case where each of the three users accesses the electronic album using the position instructing unit 12 to lay out images on a certain page, and one user does not arrange any images on that page, that user can provide an instruction for passing on arrangement using the position instructing unit 12. When a user passes on arrangement, the layout processing unit 22 provides an instruction to the layout selecting unit 16 to reduce the number of image arrangement regions by one. The layout selecting unit 16 then once again searches for a layout data set having the same number of image arrangement regions as the number of users minus the user who passed on arrangement, that is, for a layout data set having two image arrangement regions in the present embodiment, and selects that layout data set as the layout data set to be used. The selected layout data set is displayed on the display unit 30.

At this time, the user priority setting of the user who passed on image arrangement may be increased. With this arrangement, the user who passed on arrangement can enjoy an advantage when laying out an image on the next page since his/her user priority setting has been increased.

Further, even in a case where the user does not pass on image arrangement, if the position instructing unit 12 has not been operated for a certain period of time or longer, the user may be regarded as having left his/her seat and the layout data set may be reselected so that the number of image arrangement regions is reduced.

Next, an arrangement change after image data have already been arranged will be described. The image layout device 10 can appropriately change the layout contents after images have been laid out on a page. The changes that can be made include changes to images arranged in a certain region, change to positions (regions) where an image is arranged, and removal of an image already arranged.

In a case where the arranged position of an image is to be changed, first the user selects the image of the page that he/she wants to change from among the thumbnail images of each page displayed in the page verifying region 36, using the position instructing unit 12. Once the page is selected, the layout of that page appears in an editable state in the layout editing region 34.

Figure 5:
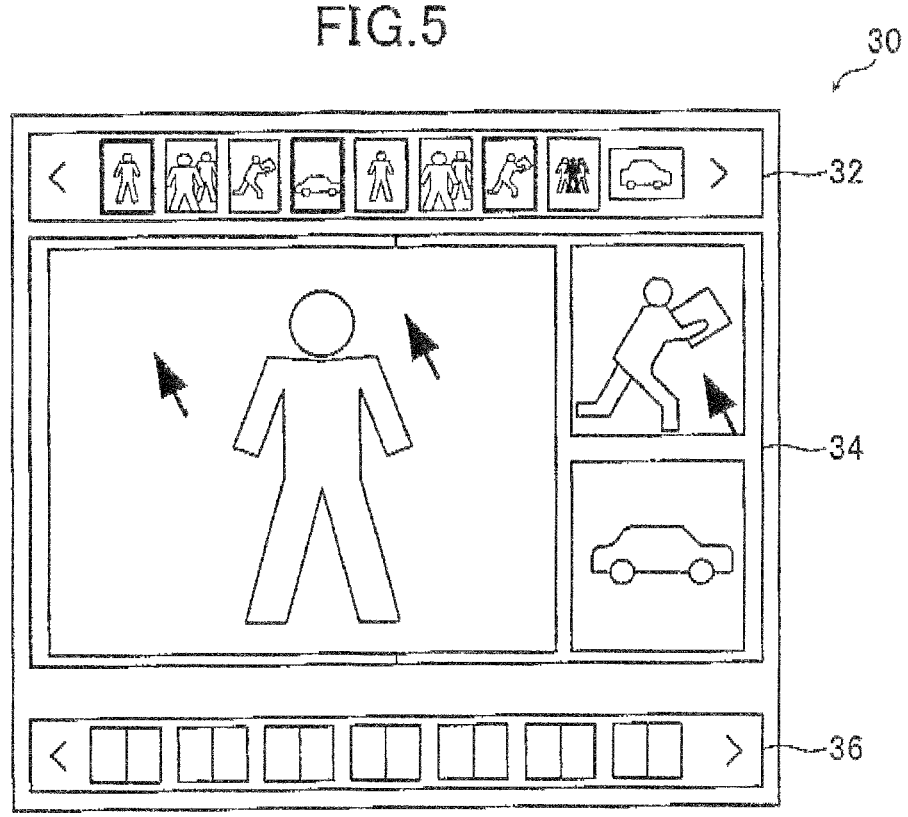
FIG. 5 is a diagram illustrating an example of the screen after the layout process is completed.

FIG. 5 shows the displayed state of a page where three images have been laid out in each image arrangement region by each user.

In FIG. 5, each of the users 1P, 2P, and 3P arranged an image in region A, region B, and region C, respectively. Further, in the image selecting region 32, the thumbnail images of the arranged images appear with bold image borders, unlike the other images, making it possible to visually understand that those images have been selected as the images to be arranged.

Figure 6A:
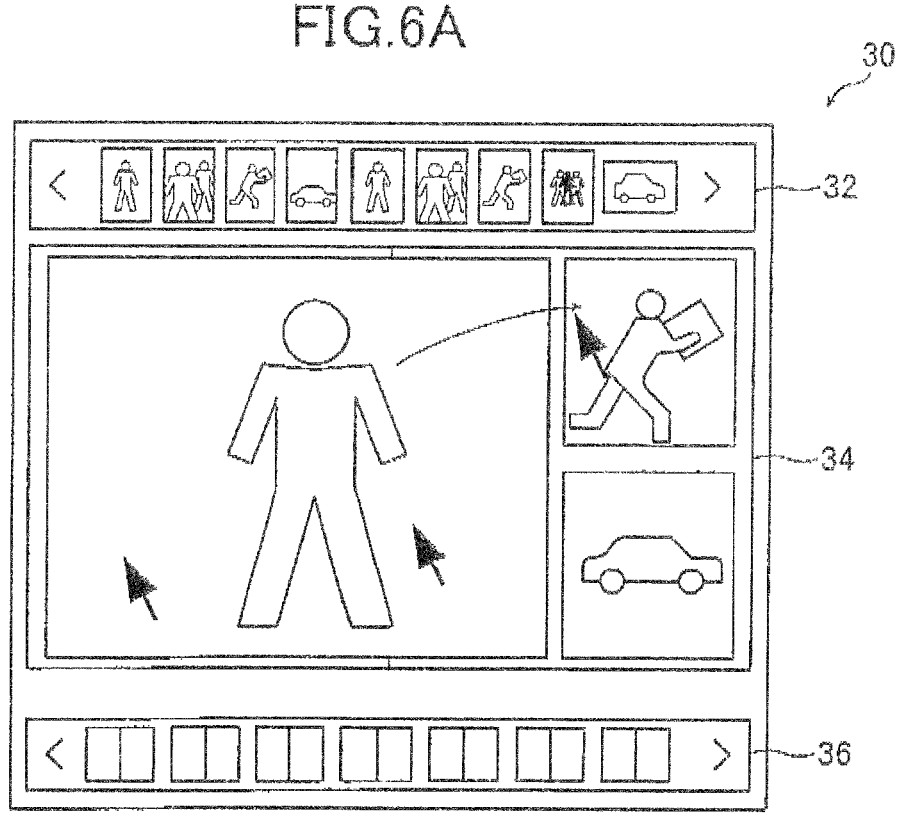
FIGS. 6A and 6B are diagrams respectively illustrating an example of the screens before and after a layout change.
Figure 6B:
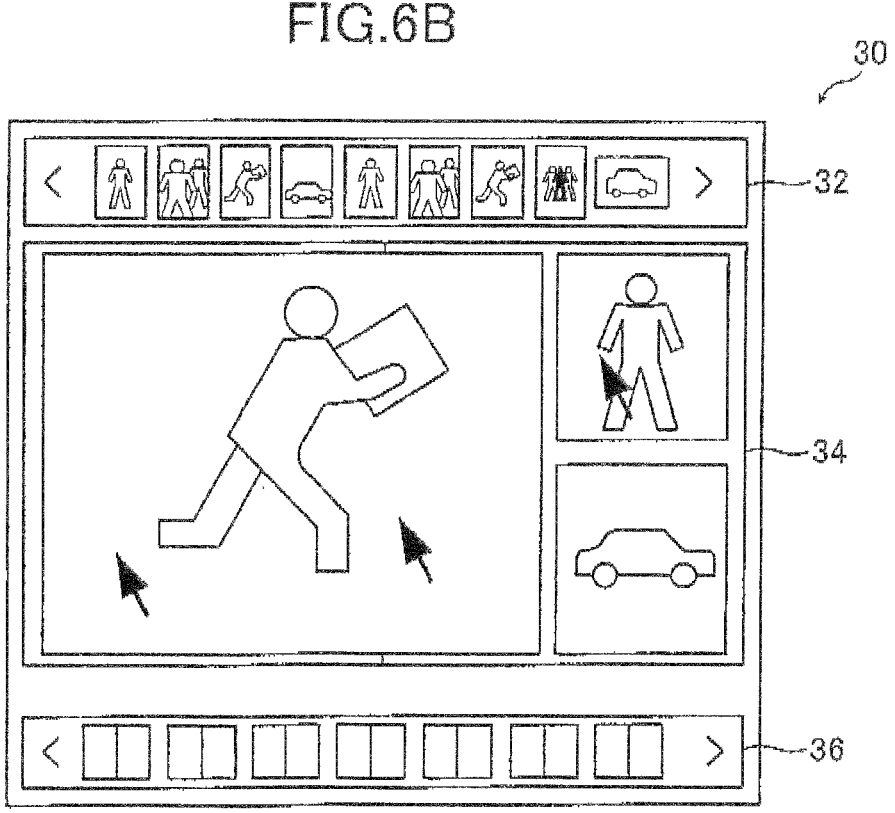

Here, as shown in FIG. 6A, the user 1P drags the image of region A using the position instructing unit 12 in an attempt to move the image arranged in region A to region B. Then, the layout processing unit 22 moves the image arranged in region A to region B, and further moves the image arranged in region B to region A. That is, as shown in FIG. 6B, the images arranged in regions A and B are switched.

In this manner, it is possible to change the arrangement of the images.

Further, the image to be arranged in region A may be reselected to change the arranged image.

For example, in a case where the user 1P wants to change an image he/she had arranged in region A to another image, the user 1P selects the new image he/she wants to arrange from the image selecting region 32. Then, using the position instructing unit 12, the user 1P drags the selected image to region A, thereby arranging the newly selected image in region A. Once the new image is arranged, the thumbnail image of the newly arranged image appears in the image selecting region 32 with a bold border, indicating that the image has been selected. Then, the image that had been arranged in region A up to that point is removed from the layout editing region 34 and its border display indicating that the image has been selected is also removed from the image selecting region 32.

Or, the arrangement of an image already laid out may be cancelled. In this case, the user selects the image to be removed from the page in the layout editing region 34 and, using the position instructing unit 12, provides an instruction to cancel the arrangement of the image. Then, the image cancelled by the instruction is removed from the layout editing region 34 and its border display indicating that the image has been selected is also removed from the image selecting region 32. The removed image is only removed from the layout editing region 34. It is not removed from the image storing unit 18, and still appears as a thumbnail in the image selecting region 32.

When such layout changes are made, the above-described user priority settings may be used.

For example, in the example shown in the figure, the user 1P has a higher user priority setting than the user 2P. At this time, as described above, the user 1P is permitted to move an image he/she had arranged in region A. Further, the user 1P is permitted to move the image of region B arranged by the user 2P.

On the other hand, when the user 2P changes the image layout, the user 2P is permitted to change the image of region B which he/she had arranged, but is not permitted to change the image of region A which was arranged by the user 1P or change the arranged position of that image. That is, the user 2P is not permitted to change any processing performed by the user 1P having a higher user priority setting that the user 2P.

Furthermore, while in this embodiment 1 one image is arranged per image arrangement region, the present invention is not limited thereto and a plurality of images may be arranged in a single image arrangement region. In such a case, an image arrangement region is assigned to each user, and the user can freely arrange a plurality of images in the image arrangement region assigned to him/her. Further, images cannot be laid out in an image arrangement region of another user.

In this case, an image arrangement region may be assigned to each user according to the user priority settings and region priority settings.

While in embodiment 1 layout data sets are provided in advance as templates and selected by the layout selecting unit 16, the present invention is not limited thereto, and the layout data sets may be conditions (rules) for setting the image arrangement regions, rather than templates.

Embodiment 2

In embodiment 2, an image layout device realizing an image layout method that uses rules for setting image arrangement regions as the layout data sets is employed.

In embodiment 2, the configuration of all components other than the layout data sets stored in the layout data storing unit 14 and the function of the layout selecting unit 16 is the same as that of embodiment 1, and a detailed description thereof will be omitted.

In embodiment 2, at least one or more rules for dividing the image arrangement region based on the number of users are stored in advance as layout data sets, for each number of users.

The layout selecting unit 16 detects the number of users from the user identification information received from the position instructing unit 12, and then finds the layout data set corresponding to the number of users from the layout data storing unit 14. Then, based on the found layout data set, the layout selecting unit 16 creates a template to be used for layout. The found layout data set may be one set or a plurality of sets. When a plurality of layout data sets has been found, the layout selecting unit 16 creates one layout template by combining the conditions of those layout data sets.

Further, the layout selecting unit 16 can create templates of a plurality of patterns in accordance with the found conditions. In such a case, the layout selecting unit 16 may automatically select which layout template is to be used from the created plurality of templates, or may select a template according to user preferences.

Thus, according to an image layout device that uses an image layout method of the present invention and a recording medium that stores a program for executing such an image layout method on a computer, image arrangement frames are prepared in an amount equivalent to at least the number of users, making it possible to increase the work efficiency of each user and perform efficient layout processing with superior workability. Further, the present invention makes it possible to proceed with layout work more efficiently by setting priority settings.

While the above has described in detail the image layout device, recording medium, and image layout method of the present invention, note that the present invention is not limited to the above embodiments and various modifications may be made without departing from the spirit and scope of the invention.

What is claimed is:

1. An image layout device configured to enable a plurality of users to lay out images, comprising: a layout data storing unit configured to store a plurality of layout data sets that specify image arrangement regions for laying out said images; a layout selecting unit configured to automatically select said layout data set from said layout data storing unit based on a number of said users; an image storing unit configured to store images; one or more position instructing unit configured to select an image to be arranged based on said selected layout data set from images stored in said image storing unit, and provide an instruction regarding an arrangement location with respect to said layout data set for said selected image; and a layout processing unit configured to determine whether or not an instruction from said instructing unit is executable and, if it is executable, arrange said selected image in accordance with said selected layout data set, wherein said layout data set is a template of a layout of said images comprising one or more image arrangement regions; and wherein said layout selecting unit automatically selects said layout data set comprising said image arrangement regions in an amount equivalent to at least a number of said users.

2. The device according to claim 1, wherein:

said layout data set is layout conditions for setting one or more image arrangement regions; and said layout selecting unit selects at least one said layout data set for setting said image arrangement regions in an amount equivalent to at least a number of said users, and generates a template used for layout based thereon.

3. The device according to claim 2, wherein said layout data set includes one or more conditions regarding either a number of said image arrangement regions or positions of said image arrangement regions.

4. The device according to claim 1, wherein;

said position instructing unit sends user identification information set per said position instructing unit to said layout selecting unit; and said layout selecting unit receives said identification information so as to detect a number of said users.

5. The device according to claim 4, further comprising:

an user priority setting unit configured to set a user priority setting per set of said user identification information; wherein:

said layout processing unit executes with priority an instruction from said position instructing unit comprising said identification information having a high said user priority setting.

6. The device according to claim 5, further comprising:

an user information managing unit configured to store in association said user identification information of said position instructing unit and said user priority setting.

7. The device according to claim 5, further comprising:

a display unit configured to display said user priority setting of each set of user identification information set by said user priority setting unit.

8. The device according to claim 1, further comprising:

an image priority setting unit configured to set an image priority setting per image stored in said image storing unit; wherein:

said layout processing unit executes with priority an instruction related to an image having a high said image priority setting.

9. The device according to claim 8, further comprising:

an image selecting unit configured to store and manage in association with said images two or more of image identification information, arrangement conditions with respect to said layout data set, and image priority settings.

10. The device according to claim 8, further comprising:

a display unit configured to display said image priority setting of each of said images set by said image priority setting unit.

11. The device according to claim 1, wherein said one or more position instructing unit provide an instruction regarding image selection and arrangement location with respect to said layout data set via a network.

12. A computer-readable recording medium storing a program for executing on a computer an image layout method that enables a plurality of users to lay out images, comprising the steps of: automatically selecting a layout data set from a plurality of said layout data sets that specify image arrangement regions for laying out said images, based on a number of said users; selecting an image to be arranged based on said selected layout data set from images stored in advance, and providing an instruction regarding an arrangement location with respect to said layout data set for said selected image; and determining whether or not said instruction is executable and, if it is executable, arranging said selected image in accordance with said selected layout data set, wherein said layout data set is a template of a layout of said images comprising one or more image arrangement regions; and wherein said step of automatically selecting a layout data set automatically selects said layout data set comprising said image arrangement regions in an amount equivalent to at least a number of said users.

13. An image layout method of enabling a plurality of users to lay out images, comprising the steps of: automatically selecting a layout data set from a plurality of said layout data sets that specify image arrangement regions for laying out said images, based on a number of said users; selecting an image to be arranged based on said selected layout data set from images stored in advance, and providing an instruction regarding an arrangement location with respect to said layout data set for said selected image; and determining whether or not said instruction is executable and, if it is executable, arranging said selected image in accordance with said selected layout data set, wherein said layout data set is a template of a layout of said images comprising one or more image arrangement regions; and wherein said step of automatically selecting a layout data set automatically selects said layout data set comprising said image arrangement regions in an amount equivalent to at least a number of said users.

* * * * *